United States Patent [19]

Lexen

[11] Patent Number: 4,815,334
[45] Date of Patent: Mar. 28, 1989

[54] DRIVE ARRANGEMENT FOR A VEHICLE

[75] Inventor: Gerald Lexen, Munich, Fed. Rep. of Germany

[73] Assignee: Man Nutzfahrzeuge GmbH, Munich, Fed. Rep. of Germany

[21] Appl. No.: 68,953

[22] Filed: Jul. 1, 1987

[30] Foreign Application Priority Data

Jul. 25, 1986 [DE] Fed. Rep. of Germany ....... 3625141

[51] Int. Cl.⁴ .................... F16H 37/06; F16H 47/04; F16H 47/08
[52] U.S. Cl. ........................ 74/661; 74/675; 74/677; 74/687
[58] Field of Search ................ 74/661, 675, 677, 687, 74/718, 720

[56] References Cited

U.S. PATENT DOCUMENTS

| | | | |
|---|---|---|---|
| 1,466,011 | 8/1923 | Youmans | 105/50 |
| 2,581,320 | 1/1952 | Burton et al. | 74/675 X |
| 2,779,213 | 1/1957 | Fell et al. | 74/675 |
| 2,878,691 | 3/1959 | Schjolin | 74/675 |
| 3,065,652 | 11/1962 | Kugel et al. | 74/720 X |
| 3,503,278 | 3/1970 | Livezey | 74/661 |
| 3,503,281 | 3/1970 | Gsching et al. | 74/675 X |
| 3,576,106 | 4/1971 | Nowicki | 74/661 X |
| 3,665,788 | 5/1972 | Nyman | 74/675 X |
| 3,683,719 | 8/1972 | Gros | 74/661 |
| 3,823,620 | 7/1974 | Bricout | 74/675 |
| 3,830,349 | 8/1974 | Williams | 74/661 X |
| 3,861,484 | 1/1975 | Joslin | 74/675 X |
| 3,951,008 | 4/1976 | Schneider et al. | 74/661 |
| 4,100,822 | 7/1978 | Rosman | 74/661 X |
| 4,516,655 | 5/1985 | Donahue et al. | 74/661 X |
| 4,569,251 | 2/1986 | Greenwood | 74/687 X |
| 4,586,400 | 5/1986 | Nygren | 74/675 |
| 4,667,536 | 5/1987 | Ehrlinger et al. | 74/720 |
| 4,684,081 | 8/1987 | Cronin | 244/58 |
| 4,718,299 | 1/1988 | Greenwood | 74/687 X |

Primary Examiner—Leslie A. Braun
Assistant Examiner—Harold F. Macris
Attorney, Agent, or Firm—Scully, Scott, Murphy & Presser

[57] ABSTRACT

The invention provides an improved form of drive arrangement for use in a motor vehicle comprising a first prime mover, a hydromechanical power branching transmission, driven by the prime mover, and having at least two hydromechanical transducers, by the inclusion of an emergency drive device which comprises a second prime mover adapted to act as a standby prime mover and an adjustable hydromechanical transducer arranged to be driven by the second prime mover. The second prime mover is adapted to supply hydraulic power via the adjustable hydromechanical transducer to the hydromechanical transducers of the power branching transmission and thence to a driven axle of the vehicle in the event of the first prime mover becoming inoperative, for example, if the first prime mover fails or (in the event of its being an electric motor) if its supply of energy breaks down.

5 Claims, 3 Drawing Sheets

DRIVE ARRANGEMENT FOR A VEHICLE

BACKGROUND OF THE INVENTION

The invention relates to a drive arrangement for a motor vehicle comprising a prime mover such as an IC engine and hydromechanical power branching transmission with at least two hydromechanical transducers. The invention is more particularly concerned with improvements in vehicles for operating regular services which have to keep to some sort of time schedule or timetable as a matter of necessity. The failure of the prime mover itself or of the supply of energy therefor is a serious matter. When this happens the vehicle is then usually fully out of service and has to be replaced. During the time in which it is waiting to be towed away it may well constitute a hinderance to traffic.

SHORT SUMMARY OF THE INVENTION

Accordingly one object of the present invention is to so improve the design of a drive arrangement for a vehicle of this type that even if the prime mover or its supply of energy fails the vehicle may still be operated to the extent that it is able to drive to a garage or place where a repair is possible.

In order to achieve this or other objects appearing throughout the course of the specification and claims, a drive arrangement for a motor vehicle of the type having a hydromechanical power branching transmission with at least two hydromechanical transducers is characterized by the provision of an emergency drive device which is made up of an adjustable hydromechanical transducer driven by a standby prime mover, such emergency drive making it possible to supply hydraulic power via the hydromechanical transducer of the emergency system to the hydromechanical transducers of the power branching transmission and via the same to the driven axle of the vehicle, more particularly in the case of failure of the drive prime mover or the energy supply thereof. Further features and developments of the invention will be seen from the claims.

The provision of this emergency drive means that the vehicle may be kept on the move at any time despite the non-operative condition of the normal drive system.

A more detailed account of the invention will now be presented which is based on the accompanying drawings showing three emodiments thereof.

LIST OF THE SEVERAL FIGURES OF THE DRAWINGS

DETAILED ACCOUNT OF THE INVENTION

Figure 1:
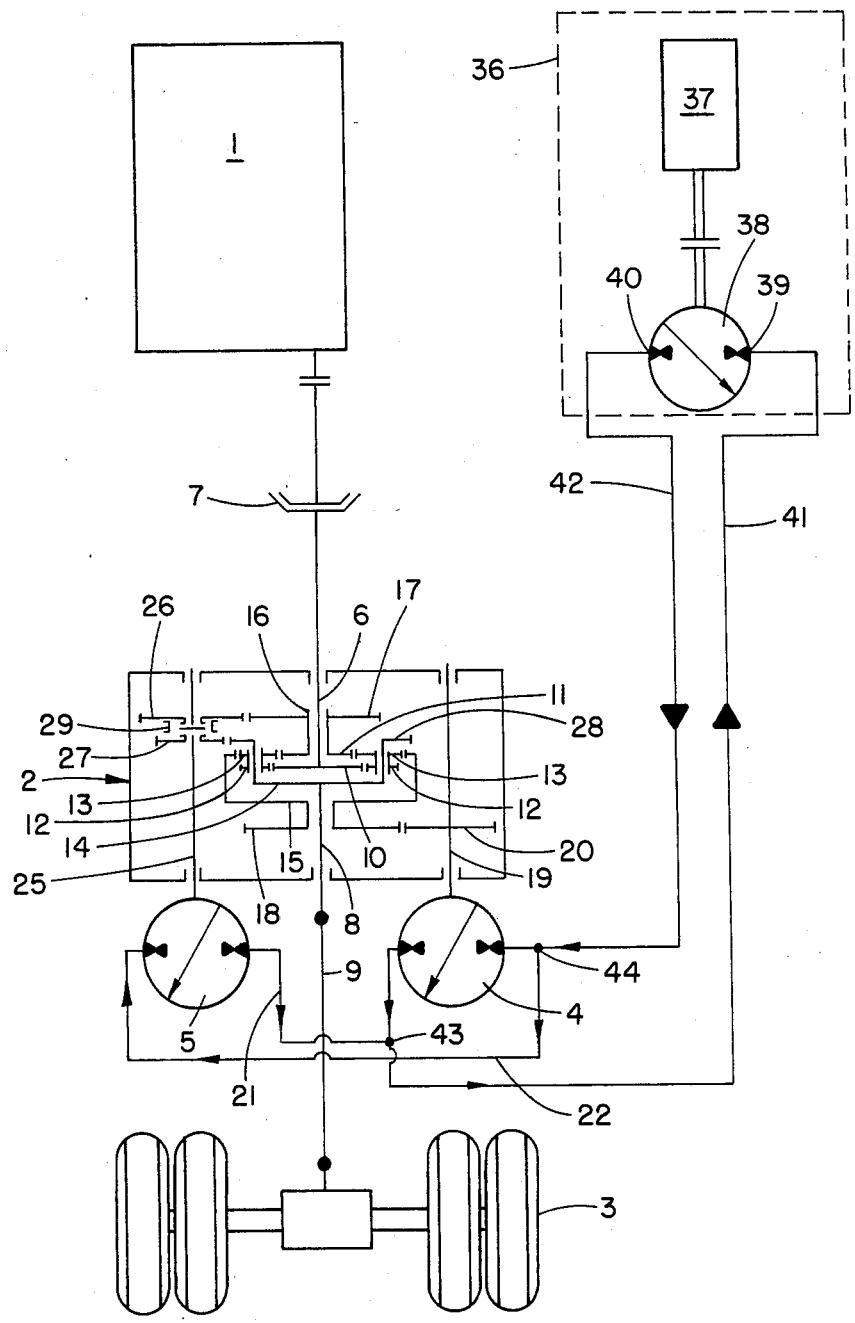
FIG. 1 is a diagram of a first embodiment of the drive system of the invention.

In the drawings it will be seen that a motor vehicle drive arrangement comprises as its main parts an engine or prime mover 1, a change speed transmission 2 and a driven axle 3.

The vehicle may be more especially one operating on a regular service necessarily having to keep to a timetable or time schedule. Furthermore the vehicle may be one used in regions with few regular passenger services.

The prime mover of the vehicle may be a diesel or gasoline engine or it may be an electric motor supplied from a battery or from a conductor via a current collector, as for example from an overhead conductor wire, as would be the case with a trolley bus.

The transmission 2 is in the form of a hydromechanical power branching transmission and more especially such a transmission having four shafts. It has at least two operational ranges and at least two hydromechanical transducers 4 and 5. Such transmissions have been proposed in the prior art for use in connection with omnibuses plying on regular services. One input shaft 6 is connected or connectable with the prime mover either directly or by way of a clutch 7. An output shaft 8 of the transmission is connected with the axle drive train 9 of the vehicle. The part of the power branching transmission 2 forming an epicyclic differential comprises a large solar wheel 10 permanently connected to the input shaft 6, a small solar wheel 11, a number of double planetary wheels 12 and 13 respectively mounted on a hollow shaft, a planetary wheel carrier 14 permanently connected with the transmission output shaft 8 and an annulus 15, whose internal gear teeth mesh with the planetary wheels 13. The small solar wheel 11 is keyed on a hollow shaft 16 which is bearinged on the input shaft 6 and furhermore carries a gear wheel 17. The annulus 15 is keyed for rotation with a gear wheel 18, which is in meshing engagement with a gear wheel 20 keyed on a shaft 19. The latter constitutes the mechanical connection with the hydromechanical transducer 4. Like the hydromechanical transducer 5, the transducer 4 may be operated in both directions, i.e. as a motor or as a pump and is connected with the transducer 5 via hydraulic operating lines 21 and 22, such connection being direct in the case of FIG. 1 and indirect via an intermediate control block 23 in the case of FIG. 2, whereas in the case of FIG. 3 there is an intermediately placed different control block 24. The gear wheel 17 mounted on the hollow shaft 16 meshes with a gear wheel 26 bearinged on a shaft 25, same constituting the mechanical connection between the hydromechanical transducer 5 and the epicyclic differential. Furthermore there is a gear wheel 27 bearinged on the shaft 25 so as to mesh with a gear wheel 28 fixedly secured to the planet carrier. Reference numeral 29 denotes a two-way clutch which in one setting connects the gear wheel 27 with the shaft 25 and in the other setting connects the other gear wheel 26 with the shaft 25. The two-way clutch 29 is able to go into a neutral setting between these two settings so that neither of the two gear wheels 25 and 27 is connected with the shaft 25. The speed of the transmission output shaft 8 is summated from the speed of the large solar wheel 10 and of the annulus 15, which determine the peripheral speeds of the planetary wheels 12 and 13 and, respectively, of the planet carrier 14. The speed and the direction of rotation of the annulus 15 are dependent on the speed and direction of rotation of the hydromechanical transducer 4 via the gear wheels 20 and 18.

The manner of operation of the working examples of the invention shown in FIGS. 1 and 2 will now be described.

In the event that the vehicle is to be acceleerated, the hydromechanical transducer 4 will operate as a pump in a first operational range of the power branching transmission 2 ($\eta_{output} : \eta_{input}$ equal to or less than 50%) in one direction of turning of the annulus 15 opposite to the direction of turning of the large solar wheel 10 and this converted power will be supplied via lines 21 and 22 of the hydromechanical transducer 5. The latter will then work as a motor and will drive the shaft 25. The two-setting clutch 29 is then in a setting in which the gear wheel 27 is coupled with the shaft 25 and accordingly there is a transmission connection via the gear wheel 28 and the planet carrier 14 for the transmission of power to the transmission output shaft 8.

In a second operational range ($\eta_{output} : \eta_{input}$ equal to or greater than 50%) in which the annulus 15 and the solar wheel 10 have the same direction of rotation the hydromechanical transducer 10 will operate as a motor, it receiving its power from the hydromechanical transducer 5 via the operating lines 21 and 22 and in this range will operate as a pump. The two-way clutch 29 is then in a setting in which the gear wheel 26 is coupled with the shaft 25. In this case the hydromechanical transducer 5 will thus receive power via the double planetary wheels 12 and 13 and the hollow shaft 16 with the gear wheels 11 and 17 from the large solar wheel 10.

When the hydromechanical transducer 4 is stationary practically the entire power is then transmitted by the epicyclic differential. In this situation the switching over of the two setting clutch 29 from one gear wheel 26 to the other gear wheel 26 takes place when the speed of rotation of the transmission output shaft 8 increases and it is switched back from the gear wheel 26 to the gear wheel 27 when such speed is decreasing.

When the vehicle is stationary the hydromechanical transducer 5 will also be stationary. In this event the hydromechanical transducer 4 has a speed proportional to the speed of the prime mover 1.

Figure 2:
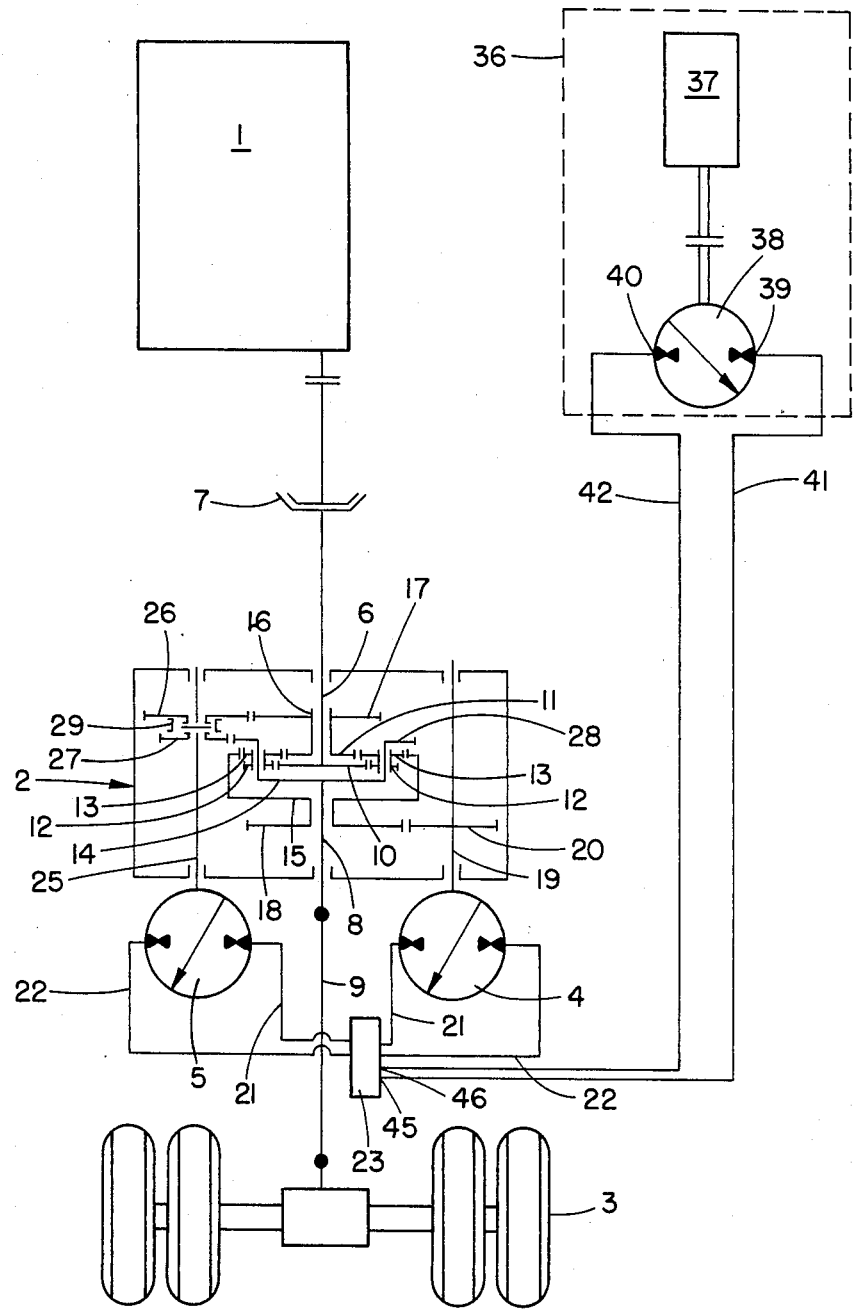
FIGS. 2 and 3 show two further working examples of the invention.
Figure 3:
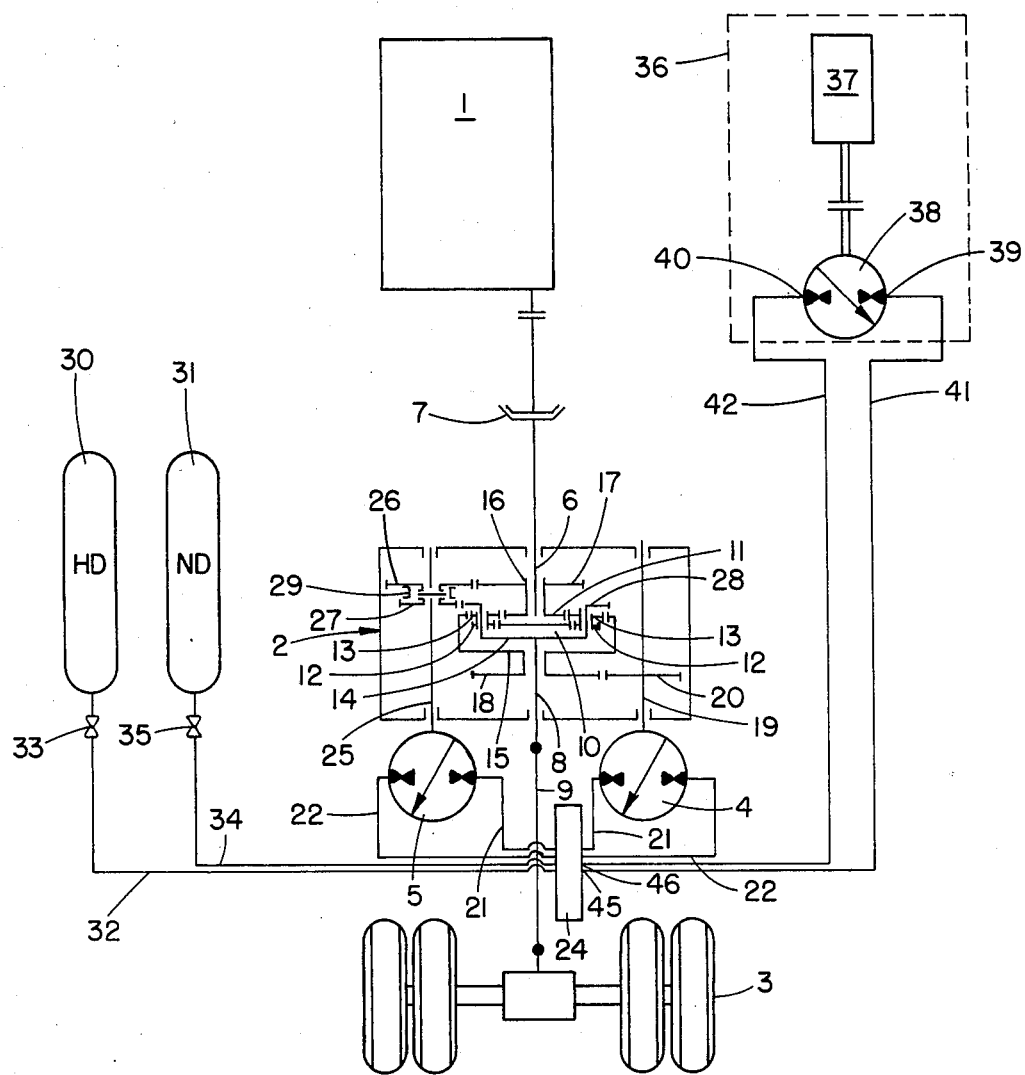

It is to be noted in this connection that the transmission so far described does not have to be constructed in the manner indicated in FIGS. 1 through 3.

The drive arrangement shown in FIG. 3 differs as regards in the relevant units of the vehicle from the arrangement of FIGS. 1 and 2 only insofar as in the said case the power branching transmission 2 is associated with different parts of the same for forming a brake energy recovery device. Such a brake energy recovery device has so far been proposed in connection with city omnibuses operating on regular services. As regards details the device has a high pressure accumulator 30, a low pressure accumulator 31, an intrinsic controller or a specially adapted control block 24, a supply line 32 branching from the latter and leading to the high pressure accumulator 30, with a controlled shut off valve 33 and a supply line 34, having a controlled shut off valve 35, leading from the control block 24 to the low pressure accumulator 31. These parts and their mutual connection and their manner of operation are known as regards the charging of the high pressure accumulator 30 on braking the vehicle and the discharge of the high pressure accumulator 30 when the vehicle is starting or speeding up.

Whatever the particular detailed design of the normal driving arrangement of the vehicle the latter is fitted with an emergency drive device 36, which consists of a standby prime mover 37 and an adjustable hydromechanical transducer 38 driven thereby. The transducer 38 may be of a standard commercial type of the oblique shaft, swash plate or the like type. The two ports 39 and 40 of the hydromechanical transducer 38 are respectively connected via a line 41 or 42 with the hydraulic connections of the hydromechanical transducer 4, as in the example of FIG. 1, directly or via a port 45 or 46 of the control block 23 (in FIG. 2) or 24 (in FIG. 3).

The standby prime mover 37 may be an electric motor able to be powered selectively from a battery or from a conductor wire or the like, and more specifically a trolley bus overhead conductor wire, or an IC engine. The prime mover may be designed to provide the same power as the drive prime mover 1, though this is not an essential feature.

Upon failure of the prime mover 1 or the supply of power thereto, the standby prime mover 37 will be put into operation. This may take place automatically or manually via a suitable control means or starter device. The standby prime mover may however also be designed to be used during normal operation for charging up the high pressure accumulator 30.

After the standby prime mover 37 has been started the driven hydromechanical transducer 38 causes hydraulic power to be supplied to the hydromechanical transducers 4 and 5 of the power branching transmission 2 and via the epicyclic differential thereof to the driven axle 3 of the vehicle. In the case of the embodiment of the invention shown in FIG. 1 this power will be directly supplied to the hydromechanical transducer 4, which will pass it on to the hydromechanical transducer 5. In the working examples of FIGS. 2 and 3 this transfer of power is by suitable switching within the control block 23 or 24, as the case may be. In the working example of FIG. 3 the power required for getting the vehicle under way is supplied by discharge from the high pressure accumulator 30 so that when the emergency device 36 is put into operation the latter will only have to supply power in the next operational ranges.

The components of the emergency drive device 36 may be readily accommodated having regard to the amount and type of space offered by the vehicle. Owing to the purely hydraulic connection to the power branching transmission 2 no special arrangement in space is required in this regard. The degree of complexity of the controlling means is low. Furthermore, the hydromechanical transducer 38 of the emergency drive device 36 may be used as a retarder as well, the circuitry and control means in this respect being provided by the control block 23 or 24, respectively, or some other device may be used. Lastly, owing to the emergency drive device 36, it is also possible to design the prime mover of the vehicle with a lower rated power so that in the event of peak power being required the extra power may be supplied by connecting and operating the emergency drive.

I claim:

1. A drive arrangement for a motor vehicle, comprising:

(a) a first prime mover;

(b) a hydrostatic-mechanical power branching transmission driven by said first prime mover, said transmission including an epicyclic differential and at least two hydromechanical transducers, said first prime mover being connected with an input shaft of said epicyclic differential, and an output shaft of said epicyclic differential being connected with drive train axle of said motor vehicle, and wherein two of said at least two hydromechanical transducers each have one shaft thereof drivingly connected with a respective different shaft of said epicyclic differential;

(c) and an emergency prime mover comprising an auxiliary motor formed by an internal combustion engine, and a variable hydromechanical transducer driven by said auxiliary motor, said emergency prime mover being selectively actuatable depending upon need and, subsequent to actuation, said variable hydromechanical transducer transmitting hydrostatic power to one of said at least two hydromechanical transducers, through said two of said at least two hydromechanical transducers of said power branching transmission to said epicyclic differential, and from said differential to said drive train axle of said motor vehicle.

2. A drive arrangement as claimed in claim 1, wherein said emergency prime mover is employed for auxiliary functions in addition to purposes of emergency drive, said variable hydromechanical transducer being operable to retard fluid flow between said two of said at least two hydromechanical trasnducers; and a hydraulic control block including switching and control components having hydraulic control conduits connected to said two of said at least two hydromechanical transducers of said power branching transmission, 3. A drive arrangement as claimed in claim 1, wherein a brake energy recovery device is operatively connected with said power branching transmission, said device comprising:
(a) a hydraulic high pressure accumulator,
(b) a hydraulic low pressure accumulator,
(c) and a hydraulic control block for controlling charging and discharging sequences having hydraulic conduits of said high pressure and low pressure accumulators connected thereto, such that during braking of said motor vehicle the kinetic energy of said vehicle is convertible through said power branching transmission into potential pressure energy which is storable in said high pressure accumulator, and said stored pressure energy is transmittable for the start-up of said vehicle from said high pressure accumulator by discharging of said accumulator through said power branching transmission to said drive train axle, and said emergency prime mover being employable for the recharging of said high pressure accumulator during the normal operation of said motor vehicle.

4. A drive arrangement as claimed in claim 1, wherein said variable hydromechanical transducer comprises an oblique shaft transducer.

5. A drive arrangement as claimed in claim 1, wherein said variable hydromechanical transducer comprises a swash plate hydromechanical transducer.

* * * * *